United States Patent [19]

Gold

[11] Patent Number: 4,635,909

[45] Date of Patent: Jan. 13, 1987

[54] COMBINATION PNEUMATIC SPRING AND SHOCK ABSORBING APPARATUS

[76] Inventor: Henning Gold, Im Rheinblick 29, 6530 Bingen 1, Fed. Rep. of Germany

[21] Appl. No.: 728,565

[22] Filed: Apr. 29, 1985

[30] Foreign Application Priority Data

Apr. 30, 1984 [DE] Fed. Rep. of Germany ... 8413300[U]

[51] Int. Cl.[4] .......................... F16F 9/04; F16F 9/348; F16F 9/36
[52] U.S. Cl. ................................. 267/64.21; 188/282; 188/317; 188/322.15; 188/322.18; 267/64.24; 267/124
[58] Field of Search ............... 267/50, 64.19, 64.21, 267/64.23, 64.24, 124, 129, 120; 188/281, 282, 317, 318, 319, 320, 322.15, 322.18; 277/103, 165, 185

[56] References Cited

U.S. PATENT DOCUMENTS

| | | | |
|---|---|---|---|
| 2,227,862 | 1/1941 | Redfield | 267/50 X |
| 3,164,225 | 1/1965 | de Carbon | 188/320 |
| 3,256,961 | 6/1966 | de Carbon | 188/317 |
| 3,312,312 | 4/1967 | de Carbon | 188/317 |
| 3,954,256 | 5/1976 | Keijzer et al. | 267/64.21 |
| 4,335,750 | 6/1982 | Bauer et al. | 277/165 X |
| 4,383,595 | 5/1983 | Schnitzius | 267/120 X |

FOREIGN PATENT DOCUMENTS

| | | | |
|---|---|---|---|
| 1535025 | 8/1968 | France | 188/317 |
| 1137219 | 12/1968 | United Kingdom | 188/320 |

OTHER PUBLICATIONS

H. Gold, Dissertation entitled *Uber das Dampfungsverhalten von Kraftfahrzeug-Gasfedern* (Aachen: Rheinisch-Westfälischen Technical Univesity, 1973 ).

Primary Examiner—Duane A. Reger
Assistant Examiner—Richard R. Diefendorf
Attorney, Agent, or Firm—Karl Hormann

[57] ABSTRACT

A novel spring-loaded damping unit having a piston mounted for sliding movement within an enclosed cylindrical housing, the piston being provided with a throttle for a controlled exchange of pressure between chambers on opposite sides of the piston wherein the throttle comprises one or more steel washers biased against seats engaging outer and inner peripheral positions on opposite surfaces of the washer. In the case of more than one washer a resilient layer may be provided between them.

12 Claims, 2 Drawing Figures

U.S. Patent  Jan. 13, 1987  4,635,909
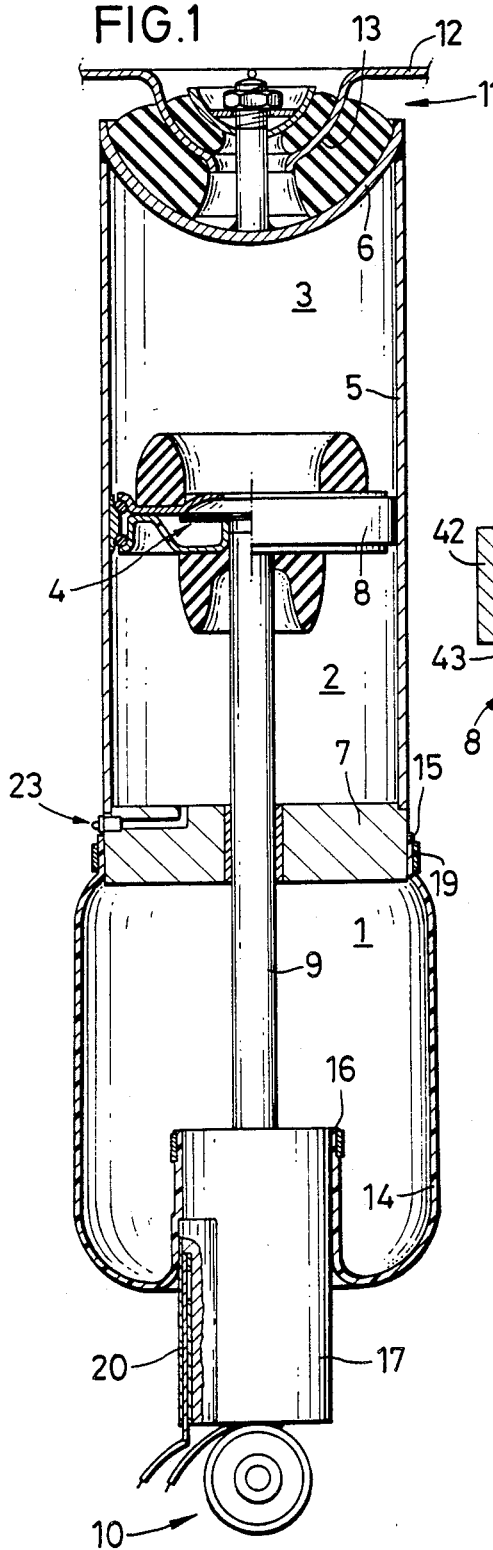
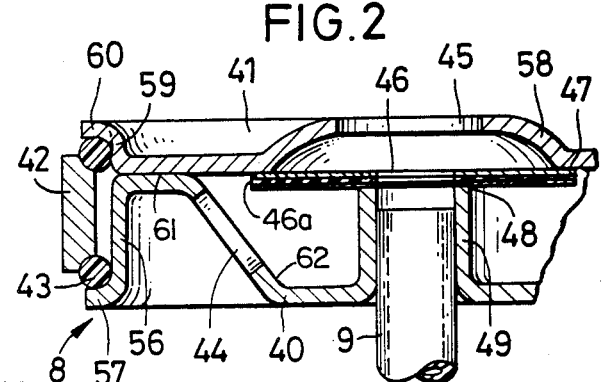

COMBINATION PNEUMATIC SPRING AND SHOCK ABSORBING APPARATUS

The present application is related to applications Ser. No. 728,618 and 728,270, filed contemporaneously herewith.

The invention relates generally to a combination pneumatic spring and shock absorber. More particularly, the invention is directed to pneumatic apparatus combining and improving the hitherto usually separate functions of coil springs and shock absorbers used in automotive wheel suspension systems. Such apparatus are known to the trade as spring-loaded damping units.

Combination pneumatic spring and shock absorber apparatus of the kind here under consideration are generally known from the Applicant's dissertation which is on file at the Institut fur Kraftfahrwesen und Kolbenmaschinen der Rheinisch-Westfalischen Technischen Hochschule (Institute for Automotive Engineering and Piston Machines of the Rhenish-Westfalian Technical University) at Aachen, West Germany.

Typically, such an apparatus comprises a cylindrical housing having top and bottom closures and a first mounting bracket, a piston slidably supported within the housing for dividing the housing into shock absorbing chambers respectively increasing and decreasing in their volumes during compression (and vice versa during expansion), throttle means within the piston for flow of pressure in both directions between the two chambers, a piston rod affixed to the piston and slidably extending through the bottom closure and through a resilient chamber formed and sealed by a rolling bellows extending between the housing and the piston rod, the piston rod being provided with a second mounting bracket.

The operativeness of the apparatus as regards both its spring function and its shock absorbing function is based substantially entirely upon pneumatic pressure. The center position of the piston within its housing is maintained substantially constant by adding or venting gas, preferably air. Thus, the spring and shock absorbing functions of the apparatus are automatically adjusted to substantially any load. This renders the apparatus particularly suited for vehicles of varying pay loads and assures comfortable spring action independently of any added loads. The device has a frequency selective shock absorbing characteristic and effectively absorbs resonant vibrations without generating large absorbtive forces at hypercritical excitations.

It is an object of the present invention to provide for an improved pneumatic spring and shock absorbing apparatus.

A specific object of the invention resides in the provision of such an apparatus of simplified construction and improved performance. Still another object resides in the provision of a pneumatic spring and shock absorbing apparatus requiring fewer parts in its assembly than prior art devices.

Yet another object of the invention is to provide an integral spring and shock absorbing apparatus made of few light weight parts of simple structure.

In the accomplishment of these and other objects the invention provides for a simplified throttle member positioned concentrically relative to the axis of the piston, the throttle member comprising at least one annular disc seated under axial tension between a first seat engaging the outer margin of the disc on one surface thereof and a second seat engaging the inner margin of the disc at the opposite surface thereof. Advantageously, the disc may be mounted in such a manner that during compression of the apparatus the disc may lift off its outer seat so that air escaping from the reducing absorption chamber may flow into the expanding absorption chamber around the outer periphery of the disc. During expansion of the apparatus, the disc may lift off its inner seat and air may thus flow from the reducing chamber into the expanding chamber around the inner margin of the disc. The disc may advantageously be formed of steel. It may have an outer diameter of about 50 mm and a thickness of about 0.3 mm.

To prevent audible vibrations, i.e., whistling noises, from being generated by the disc during shock absorbing functions of the apparatus, at least two superposed discs with a layer of a viscous elastic or rubber elastic substance between them may preferably be placed between the outer and inner seats. The discs may be vulcanized or glued to each other. It has been shown to be particularly advantageous to provide a thin layer of a lubricant between the discs, a long-life mineral lubricant being the preferred substance. This would lastingly prevent the annular discs from generating audible vibrations during shock absorbing functions of the apparatus. The discs are preferably biased against each other, and the lubricant employed may be of the kind commercially available for the lubrication of ball bearings.

The throttle means in accordance with the invention offers the advantage of the shock absorbing characteristics as well as the spring function of the apparatus being changeable by simple and inexpensive means, as for instance, by inserting one or more discs of varying thicknesses into the piston. The bias of the discs may be determined by the relative location of the two seats. However, for purposes of simplifying the structure, the two seats may be positioned in a common plane so that the bias exerted on the inserted disc may substantially result from its thickness and/or from a dished formation imparted to the disc.

The piston is advantageously formed of two stamped pieces of steel sheeting connected to each other by welding or the like in substantially the same plane as the outer seat of the throttle disc. The piston thus formed may be provided with radial flanges between which there may be elastically retained a piston ring of unitary structure. The piston ring separates the two shock absorption chambers; it is guided and centered solely by the inner wall of the housing. This structure of the piston is of advantage in that it permits assembling the piston as well as the throttle means of simple and light weight yet very strong materials. There is provided within the piston a tubular hub into which the piston rod may be inserted and affixed. The end of the hub opposite the piston rod may form the inner seat for the annular disc or disc assembly.

Reference may now be had to the detailed description of a preferred embodiment, taken together with the drawings in which FIG. 1 is a view in longitudinal section of a pneumatic spring and shock absorber apparatus in accordance with the present invention, and FIG. 2 is a view in longitudinal section and partially broken away, on an enlarged scale, of the piston of the apparatus of FIG. 1.

The pneumatic spring and shock absorber assembly depicted in FIG. 1 comprises a resiliently compressible chamber 1 and two shock absorbing chambers 2 and 3.

During compression of the unit, the volume of the resilient chamber 1 as well as that of the absorbing chamber 3 is reduced while the volume of the shock absorbing chamber 2 is increased. Conversely, during expansion of the apparatus the volume of the chambers 1 and 3 is increased while that of chamber 2 is reduced. The compressible resilient chamber 1 is located within a resilient rolling bellows 14, and the shock absorbing chambers 2 and 3 are provided within a cylindrical housing 5. They are separated from each other by a piston 8 which is slidably mounted within the housing 5. The housing 5 is closed at its opposite ends by top and bottom closures 6 and 7, respectively. The bottom closure 7 separates the shock absorbing chamber 2 from the resilient compression chamber 1.

A throttle member 4 provided within the piston 8 provides for communication, or exchange of pressure, between the two shock absorbing chambers 2 and 3, in both directions. Attached to the piston 8 is a piston rod 9 which extends through the shock absorbing chamber 2, the bottom closure 7 of the housing 5, and through the compressible chamber 1. The closure 7 is provided with an appropriate packing. Near its end opposite the piston 8 the rod has fixedly attached thereto a sleeve 17 cooperating with the bellows 14. The lower end (FIG. 1) of the sleeve 17 is provided with a mounting bracket 10. At its opposite end, adjacent the closure 6, the apparatus is provided with another mounting bracket 11. For instance, the mounting bracket 11 may be used for attaching the apparatus to a bracket 13 of an automotive chassis 12, and the lower mounting bracket 10 may serve to connect the apparatus to an axle of an automobile.

An externally controllable throttle member (not shown) may be seated within the bottom closure 7 for connecting the shock absorbing chamber 2 with the resilient compressible chamber 1. Such a throttle may be used for changing the resilient as well as the shock absorbing characteristics of the apparatus. The shock absorbing chamber 3 may also be connected to the resilient chamber 1. Such a connection may be established by rendering the piston rod 9 hollow and by providing appropriate apertures in the piston rod 9 or in the sleeve 17. Such a connection may be provided with or without throttle means and may be controllable by external means.

At its end 15 having the larger diameter, the resilient rolling bellows 14 is connected to the lower end of the housing 5 by means of a clamp 19. The smaller end 16 of the bellows 14 is connected to the upper end of the sleeve 17. During compression of the apparatus, i.e., when the piston rod slides into the housing 5, the bellows 14 thus rolls along the sleeve 17.

Mounted on the sleeve 17 is a level switch 20 by means of which the pneumatic pressure within the apparatus may be adjusted to the load carried by the spring and shock absorber unit. The pressure within the unit may be changed by way of a pneumatic conduit 23 connected to the bottom closure 7 of the housing 5 and leading into the shock absorbing chamber 2 from a pump or pressure reservoir (not shown).

The apparatus is always mounted with preloaded spring bias, and it is such that spring forces and shock absorbing forces are inseparable. In order to obtain good acoustic insulation between the apparatus and the load carried by it, the mounting bracket 11 comprises a soft cushion member with a large surface area.

As may be seen in FIG. 2, the piston 8 comprises two stamped metal sections, i.e., a lower section 40 and an upper section 41, as well as a piston ring 42. The piston ring 42 is retained in position by two elastic rings 43. The piston sections 40 and 41 are connected to each other at an annular portion 61 near their periphery. The connection may be established by welding, soldering, riveting, or the like. The lower section 40 is provided at its center with an upwardly extending hub 49 to which the upper end of the piston rod 9 is connected by welding or soldering. The lower section 40 also has an inclined annular wall portion 62 within which there is provided a plurality of openings 44. At its periphery, the portion 40 has a wall member 56 extending substantially axially and ending in a radially crimped flange 57. The upper portion 41 is provided in its center with an upwardly extending bulge 58 having a central opening 45. The upper portion 41 also is provided with an axially extending peripheral wall 59, the upper end of which extends into a radial flange 60. The throttle member 4 is arranged between the portions 40 and 41.

In the embodiment shown, the throttle member 4 consists of two annular discs or washers 46 made of steel. They are of substantially planar configuration at least when mounted. The annular discs 46 are mounted within the piston 8 in such a manner that depending on the direction in which the piston 8 is moving, the flow of gas or air between the shock absorbing chambers 2 and 3 takes place either around the periphery or through the central opening of the discs 46. There is provided between the discs 46a elastic viscous material, preferably a long-life lubricant. Because of this layer 46a otherwise audible vibrations between the discs which would be generated when air moves under pressure from one chamber into the other, are prevented. The annular steel discs 46 may have an external diameter of from about 35 mm to about 60 mm, and an internal diameter of from about 20 mm to about 30 mm, and they may have a thickness of from about 0.1 mm to about 0.2 mm. The lower disc 46 is supported at its internal margin by a seat 48 formed by the upper end of the hub 49. The upper disc 46, on the other hand, is seated by its external marginal portion against an annular seat 47 surrounding the bulge 58, at the lower surface of the upper portion 40 of the piston 8. In order to obtain smaller absorbing forces during compression of the apparatus than during its expansion, the arrangement of the throttle member of the described embodiment may be such that during compression the disc 46 is lifted off its seat 47 to allow air to flow from the chamber 3 into the shock absorbing chamber 2 through the opening 45 and around the outer periphery of the discs 46. During expansion of the apparatus, the inner margin of the disc 46 may be lifted off the seat 48 to allow air to flow from the chamber 2 through the opening 44 and around the internal margin of the disc 46.

For engaging the annular discs 46 both seats 47 and 48 (see FIG. 2) may be positioned in a substantially common plane provided by the gap between the portions 40 and 41 of the piston 8. If desired, the bias of the disc 46 may be adjusted by locating the seats 47 and 48 in different planes. Also, as indicated by dashed lines in FIG. 2, the disc 46 may be given a slightly shallow or dished configuration to provide not only for the desired bias but also for different absorptive characteristics during compression and expansion of the apparatus.

The piston ring 42 is maintained in its position by the slightly stressed elastic rings 43 seated between the flanges 57 and 60 and the axial walls 56 and 59 of the piston 8. The piston ring 42 is of one piece construction and is centered by the cylindrical inner wall of the housing 5. Elastic deformation of individual components of the apparatus occurring during operation thereof cannot, therefore, adversely affect the sealing function of the piston 8. Instead of the two annular discs 46 shown in the described embodiment, fewer or more discs may be substituted depending upon the desired functional characteristics of the apparatus.

It will be apparent to those skilled in the art that the embodiment herein described represents but one of several possible concrete examples in which the invention may advantageously be utilized. The embodiment is not intended as limiting the scope of protection sought; the scope of protection is defined in the appended claims.

What is claimed is:

1. A combination pneumatic spring and shock absorbing apparatus, comprising:

a. substantially cylindrical housing;

closure means for closing opposite ends of said housing, one of said closure means comprising first mounting means;

piston means coaxially mounted within said housing for sliding movement between said opposite ends and for separating said housing into first and second absorption chambers of respectively increasable and decreasable volumes, said piston means comprising first and second sections each providing an annular surface radially offset from and contric to the other;

a piston rod having a first end section coaxially connected to said piston means and a second end section extending through the other of said closure means and provided with second mounting means;

substantially tubular resilient means having one end connected to said housing adjacent said other closure means and an opposite end connected to said piston rod adjacent said second end section for forming a resilient spring chamber;

throttle means provided within said piston means for permitting limited exchange of pneumatic pressure between said first and second absorption chambers, said throttle means comprising a plurality of coaxially superposed annular disc members separated by a substantially thin layer of substantially elastic material and biased against each other by the outer marginal portion of one of said disc members engaging one of said annular surfaces and the inner marginal portion of another of said disc members engaging the other of said annular surfaces, whereby said exchange of said pneumatic pressure in one direction between said first and second absorption chambers takes place substantially by way of said outer marginal portion and in the opposite direction substantially by way of said inner marginal portion.

2. The apparatus of claim 1, wherein said layer of elastic material comprises a viscous material.

3. The apparatus of claim 2, wherein said viscous material comprises a mineral lubricant.

4. The apparatus of claim 1, wherein said layer of elastic material comprises rubber.

5. The apparatus of claim 1, wherein said annular disc members comprise steel washers having a thickness of from about 0.1 mm to about 0.2 mm, an outer diameter of from about 35 mm to about 60 mm, and an inner diameter of from about 20 mm to about 30 mm.

6. The apparatus of claim 1, wherein said annular surfaces are axially displaced from each other and the bias between said disc members is a function of the axial displacement between said annular surfaces.

7. The apparatus of claim 1, wherein said first and second sections of said piston means comprise coaxially aligned annular members for respectively providing said annular surfaces.

8. The apparatus of claim 7, wherein one of said annular members comprises an axially extending hub for connection with said first end section of said piston rod and for providing said other of said annular surfaces.

9. The apparatus of claim 8, wherein the other of said annular members comprises an axially bulging portion having an opening therein, the base of said bulging portion comprising said one of said annular surfaces.

10. The apparatus of claim 8, wherein said annular members comprise sheet metal stampings connected to each other in a plane substantially common with said one of said annular surfaces and wherein said one of said annular members comprises at least one opening therein.

11. The apparatus of claim 7, wherein said annular members comprise radially extending annular flanges of substantially equal diameter for providing an annular recess for mounting a unitary piston ring therein.

12. The apparatus of claim 11, wherein said piston ring is resiliently retained within said annular recess by elastic ring members seated between said flanges and said piston ring.

* * * * *